March 29, 1966 H. U. RAGLE, JR 3,243,789

VERIFICATION AND CORRECTION OF MAGNETIC RECORDING DURING A SINGLE PASS OF THE TRANSDUCER

Filed June 29, 1962 2 Sheets-Sheet 1

HERBERT U. RAGLE, JR.
INVENTOR.

BY Nathan N. Kallman

ATTORNEY

March 29, 1966 H. U. RAGLE, JR 3,243,789

VERIFICATION AND CORRECTION OF MAGNETIC RECORDING DURING A SINGLE PASS OF THE TRANSDUCER

Filed June 29, 1962 2 Sheets-Sheet 2

HERBERT U. RAGLE, JR.
INVENTOR.

BY Nathan N. Kallman

ATTORNEY

United States Patent Office 3,243,789

Patented Mar. 29, 1966

3,243,789

VERIFICATION AND CORRECTION OF MAGNETIC RECORDING DURING A SINGLE PASS OF THE TRANSDUCER

Herbert U. Ragle, Jr., San Jose, Calif., assignor to Ampex Corporation, Redwood City, Calif., a corporation of California Filed June 29, 1962, Ser. No. 206,361
9 Claims. (Cl. 340—174.1)

This invention relates to magnetic recording, and in particular to an improved means for checking and correcting recorded information on a magnetic medium or tape.

It is known that during the recording process wherein a storage medium such as a magnetic tape is used, there may be signal dropout or erroneous bits of information may be recorded on the medium for various reasons. Several solutions have been offered for compensating for such errors when the recorded signal is being reproduced, but these solutions generally require separate read and write magnetic transducers or heads, together with elaborate circuitry. Furthermore, it is usually necessary to backspace or rewind to the area or bit of the storage medium that contains the error, after discovery of the error, to make the necessary correction. Therefore, prior art systems are relatively expensive and time consuming for achieving the checking and correction functions, and are subject to crosstalk between the magnetic read and write heads.

In copending patent application S.N. 154,716, filed on November 24, 1961, entitled "Simultaneous Write-Read Head," a magnetic transducing system is defined wherein a single magnetic head with a single nonmagnetic gap is utilized for simultaneous recording and playback. Such magnetic transducing system is particularly useful for recording data signals, such as NRZ (Non-Return-to-Zero) pulse signals for example. It would be highly desirable to employ this system in conjunction with a checking or readout apparatus so that one may determine whether a previously recorded magnetic medium or tape has experienced dropout or registered erroneous information, then correct the error immediately, and then read out the correction all during the same pass of the tape.

An object of this invention is to provide an improved, simplified system for playback of a recorded signal, with correction of the signal if necessary, and immediate readout of the corrected signal during a single pass of the recorded storage medium that traverses a transducer.

Another object of this invention is to provide a novel system employing only one magnetic head with a single nonmagnetic gap for verifying the accuracy of a magnetically recorded signal.

In an embodiment of this invention, a system is provided for reproducing a recorded information signal, determining whether the recorded signal is accurate, recording a correction signal if necessary, and reading the correction signal during a single pass of a recorded tape. The system comprises a magnetic transducer with a single nonmagnetic gap that transduces the magnetically recorded signal to a corresponding electrical signal, which is then directed to a bridge circuit.

While the tape portion or discrete area bearing the recorded signal that is being vertified is still adjacent to the nonmagnetic gap and approaching the center of the gap, the transduced electrical signal related to the recorded signal is directed from the bridge circuit to a decision circuit for determining the accuracy of the particular recorded information signal. If there has been a signal dropout or an erroneously recorded signal at the discrete area under surveillance, a correction signal derived from the decision circuit is automatically applied to the magnetic transducer circuit, through a time delay circuit having a predetermined delay time, for recording the correction signal at such discrete area of the tape, while the discrete area is substantially adjacent to the center of the gap. The recorded correction signal may be read out and verified immediately while the tape area carrying the newly recorded signal is still in the vicinity of the gap. In this manner, the functions of readout, correction recording, and verification of the correction may be achieved during a single pass of a magnetic tape with the use of a single magnetic head having a single nonmagnetic gap.

The invention will be described in greater detail with reference to the accompanying drawings, in which.

Figure 1:
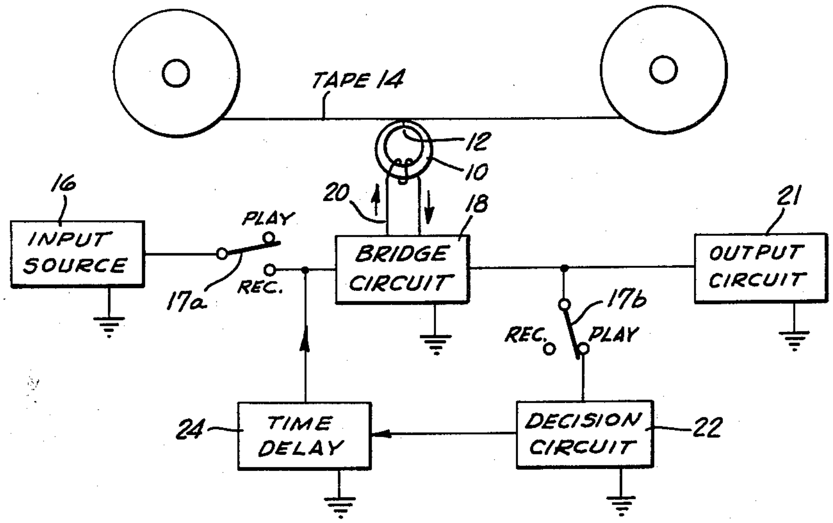
FIGURE 1 is a schematic and block diagram of an embodiment of the inventive system in simplified form.

In FIGURE 1, an embodiment of the invention comprises a magnetic transducer or head 10 having a nonmagnetic gap 12 that is used for scanning a magnetic medium or tape 14 that traverses the gap 12, in a well known manner. Tape driving and tape guiding parts and associated elements are not shown as they are not necessary for explanation of this invention.

When recording an information signal initially on the magnetic tape 14, the input signal is derived from a source 16 that feeds an information signal through a switch 17 (closed for "RECORD") to a bridge circuit 18, and then to a winding or coil 20 associated with the magnetic head 10. The input signal is recorded sequentially on discrete areas of the moving magnetic tape 14, and as each discrete tape area bearing information in the form of magnetization progresses past the nonmagnetic gap 12, static and dynamic readout signals are obtained through the magnetic circuit associated with the magnetic head 10, in a manner described in copending patent application, S.N. 154,716. The readout signals are received by an output or utilization circuit 21 coupled to the bridge circuit 18 for immediate playback.

However, in keeping with this invention, a storage medium or tape that has been prerecorded may be read out and verified, and then if necessary, the functions of writing to correct the prerecorded signal and reading out the corrected signal are sequentially achieved while the tape is traversing the nonmagnetic gap of the transducer.

To accomplish these steps in series during the same pass of the prerecorded tape, the switch 17*a*, *b* is set for "Playback." If an information signal has been accurately recorded on the discrete area of the tape 14 that is being checked, the bridge circuit 18 receives an electrical signal representative of the magnetically recorded information while the discrete tape area encompassing such information is in the vicinity of the gap 12 and approaching the center of the gap. The bridge circuit 18 provides an output signal that is sensed by a decision circuit 22 that verifies the accuracy of the discrete information signal or bit being checked. If the information bit is accurate, the decision circuit 22 verifies this fact and there is no correction signal passed by the decision circuit 22.

On the other hand, if there has been a tape dropout or a spurious signal has been recorded on the tape 14 and sensed by the decision circuit 22, the decision circuit 22 provides a correction signal through a time delay 24 to the input circuit associated with the bridge circuit 18. The time delay 24 provides a delay interval to the correction signal such that the correction signal is passed through the bridge circuit 18 and provides a corresponding magnetic flux at the gap 12 at the same instant that the tape area having the erroneously recorded information reaches the recording area at the center of the gap 12. Thus the correction signal is recorded on such tape area, simultaneously erasing the erroneous signal. Of course, it is understood that if the tape area is defective so that no recording is possible, such as may occur with a hole or a tear, the correction signal will not appear thereon. In such event, provision may be made to rerecord the information at another portion of the tape or on another tape.

Figure 2:
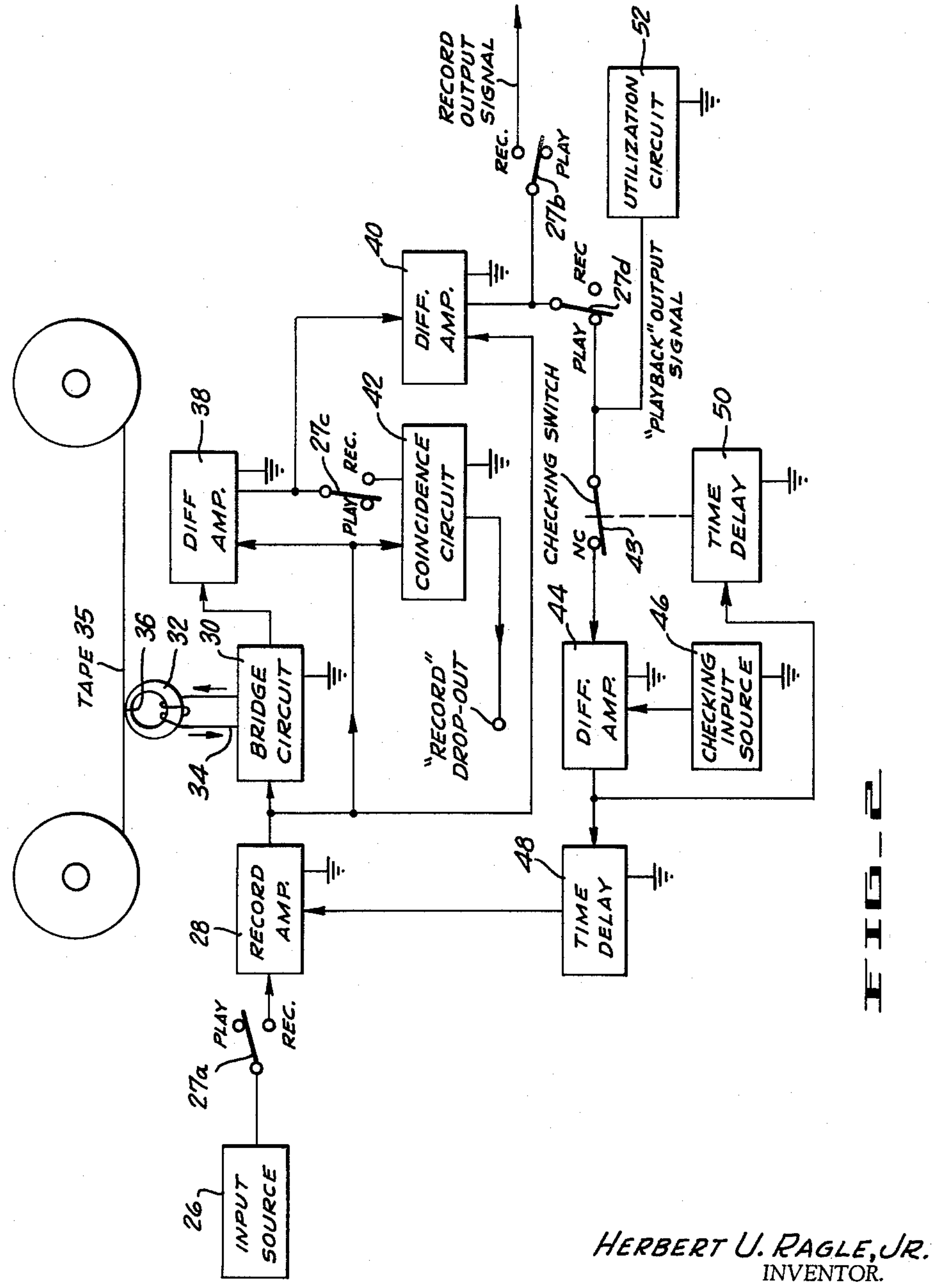
FIGURE 2 is a more detailed schematic and block diagram of a reliability recording system, in accordance with the invention.

In FIGURE 2, a more detailed diagram of the inventive system is illustrated. In the operation of this system, with all switches in "Record" position, an information signal is derived from an input source 26 and passed through a switch 27*a* to a head driver or record amplifier circuit 28. The amplified information signal is directed to a bridge circuit 30 and is then fed to the head circuit associated with a magnetic tranducer 32 through a winding 34 coupled to the transducer 32. The information signal is recorded successively on discrete areas of a moving magnetic tape 35 as each discrete tape area enters the flux path of the nonmagnetic gap 36 in the transducer 32, and approaches the center of such gap.

While the recorded discrete area of the tape 35 is still in the vicinity of the gap 36, the recorded signal is sensed and processed by the bridge circuit 30. The output signal from the bridge circuit 30, representing the recorded signal, is directed to a difference amplifier 38 simultaneously with the information input signal received directly from the recorded amplifier 28. If the bridge circuit output signal is identical to the amplifier output information signal, then there is no output signal produced by the difference amplifier 38. In such event, a second difference amplifier 40 coupled to the output circuit of the first difference amplifier 38 receives a signal from the output circuit of the record amplifier 28 only, thereby providing, through a switch 27*b*, a "Record" output signal that may be utilized in a monitor or other visual means to indicate the nature of the signal being supplied to and recorded on the tape 35.

The same information input signal that was supplied to the amplifiers 38 and 40 from the recorded amplifier 28 is also simultaneously applied to a coincidence circuit 42. In the absence of an output signal from the difference amplifier 38, which occurs when the recorded signal is equivalent to the information signal that is passed through the record amplifier 28, the coincidence circuit 42 does not produce an output signal.

On the other hand, if the recorded signal is different from the information signal that is applied simultaneously to the difference amplifiers 38 and 40 and the coincidence circuit 42, such as may occur during tape droupout or when the signal is erroneously recorded, the difference amplifier 38 will provide a difference signal to the coincidence circuit 42 through a switch 27*c*. When the coincidence circuit 42 receives the difference signal simultaneously with the information signal, a dropout signal or voltage is developed to indicate that there has been a dropout or erratically recorded signal. Thus, since dropout signals may be detected during the "Record" mode, the operator is able to determine whether it is necessary or desirable to rerun the tape for correction of the recorded information, employing the inventive system disclosed herein.

The system of FIGURE 2 may also be operated, in accordance with this invention, to verify the accuracy of information on a prerecorded tape, to make corrections of the prerecorded information if necessary, and to check the corrected signal all during the same pass of the tape.

In the "Playback" mode with all the switches 27*a–d* in "Playback" position, and with a normally closed "Checking Switch" 43 engaged, the tape 35 is moved relative to the gap 36. In the case where the information signal is correctly recorded, the bridge circuit 30 receives and passes an electrical signal, corresponding to the correctly recorded information signal, to the difference amplifier 38.

The circuit of the difference amplifier 38 is set at a threshold voltage, which corresponds to a predetermined minimum voltage of the information signal being reproduced. If the reproduced information signal has a magnitude greater than the predetermined minimum voltage, it is directed to the signal difference amplifier 40, which also includes a similar threshold voltage circuit, and thence to a third difference amplifier 44. Simultaneously a verification signal that is obtained from a checking input source 46 is applied to the third difference amplifier 44 to check the accuracy, that is, the polarity and amplitude of the signal being reproduced. If the signal is accurate as measured by the checking signal, then there is no output signal generated by the difference amplifier 44. The checking input signal may be derived directly from the input signal source 26, or from a synchronized memory system having the same sequence of information as is being applied to the transducing system for recording.

However, if there is an erroneous signal being reproduced or a complete dropout, the difference amplifiers 38 and 40 do not pass the signal to the amplifier 44. In such event, the checking input signal that represents the correct signal is directed through a time delay 48 to the record amplifier circuit 28. The time delay 48, which may provide a 25 microseconds delay at a tape speed of 60 inches per second, or a 50 microseconds delay at 30 i.p.s for example, serves to delay the checking or correction signal for a period, during which the discrete area of the tape 35 being checked moves to the recording zone at the center of the gap 36. The correction signal thus appears at the bridge circuit 30 at such instant to achieve recording thereof at the discrete area carrying the incorrect information bit thereby replacing the erroneous signal or the dropout previously recorded thereon and just sensed at the leading portion of the gap 36.

Also, to avoid undesirable oscillation in the closed feedback loop coupled to the input and output circuits of the bridge circuit 30, which includes the difference amplifiers 38, 40, 44, the time delay 48 and the record amplifier 28, a time delay 50 is connected between the output and input circuits of the third difference amplifier 44. In the presence of an output correction signal from the difference amplifier 44, the time delay 50 serves to disengage the normally closed checking switch 43 for a predetermined interval. By way of example, the time delay 50 may provide a delay to the processed signal of 55$\mu$ seconds at a 60 i.p.s. tape speed, or 110$\mu$ seconds at a 30 i.p.s. speed. It is noted that the checking switch 43 may be electrical or mechanical, as long as the switch may be opened and closed within the desired time interval. This interval affords time for recording of the correction signal and precludes the passage of such correction signal from the bridge circuit through the closed loop that includes the difference amplifier 44 during the correction recording process. The extent of the delay interval is determined in accordance with the various system parameters, such as the speed and packing density of the tape 35, and the width of the gap 36, among other things. In this manner, a prerecorded tape that is capable of carrying correct signal information, but which has registered spurious signals as a result of noise, transients, or other undesirable effects that may be inherent in the recording system, may be altered to provide an accurately recorded sequence of information by the consecutive steps of readout and correction during the same pass of the tape.

Furthermore, as the tape 35 traverses the gap 36 and approaches the trailing portion of the gap, the correction signal is sensed by the bridge circuit 30 so that an observation of the correction signal may be made. Again, the correction signal is passed through the difference amplifier 38 and the difference amplifier 40 through the switch **27*d* to a utilization circuit 52, which may be a monitor or scope that may provide a visual indication of the playback output signal. During this operation, the checking switch 43** is open so that no correction recording will occur for the approaching information bit in the event that the correction signal itself has been erroneously recorded.

It is understood that only one discrete tape area carrying one information bit occupies the gap area during the multiple steps of initial readout, correction and playback of the correction signal. Also, in those cases where the tape 35 is physically damaged, such as tears, holes, or lack of magnetic material, no recorded signal, correction or otherwise, can be stored on those tape portions. In such event, the signal information that should have been stored on those defective portions may be recorded elsewhere, either on the same tape or on a new tape with proper indexing.

Figure 3:
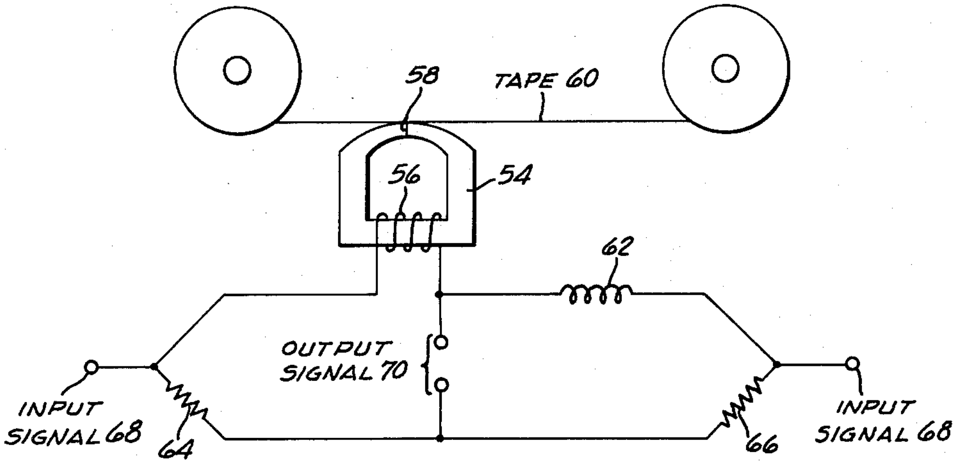
FIGURE 3 is a schematic diagram of a bridge circuit employed with the inventive system.

In FIGURE 3, there is shown a bridge circuit such as employed in the system of FIGURES 1 and 2. The circuit is coupled to a magnetic core 54 by a coil 56 wound around the core. The core 54 has a single nonmagnetic gap 58 across which the magnetic medium or tape 60 passes during the simultaneous recording and reproducing process. The bridge circuit includes the coil 56 connected in series with an inductive element 62. The balanced bridge circuit also includes a pair of series connected resistances 64 and 66 that are coupled to the coil 56 and the inductive element 62 in a balanced configuration. The coil 56 and the resistance 64, which form a first leg of the bridge, preferably have an inductive and resistive value equivalent to that of the second leg comprising the inductive element 62 and the resistance 66.

An input signal that is to be recorded and simultaneously reproduced may be applied across a pair of input terminals 68 coupled to the bridge circuit. An output signal may be derived from a pair of output terminals 70 connected between the first and second legs of the bridge circuit. The input signal applying means and the output signal deriving means are interconnected in a common balanced circuit.

Thus, the magnetic flux developed in the magnetic core 54 by an input signal is effectively negated by the balanced circuit, and only such signal information that has been accurately recorded on the magnetic tape 60 disposed adjacent to the single nonmagnetic gap 58 may be reproduced. The output signal comprises static and dynamic readout signals. The bridge circuit is capable of processing RZ (Return-to-Zero) or NRZ (Non-Return-to-Zero) pulse signals, sine wave signals, or any data signal of an alternating current character.

There has been described herein a novel system for the playback of a prerecorded storage medium wherein immediate verification of the prerecorded signal is achieved, with subsequent correction if necessary, and wherein verification of the correction signal is also provided all during the same pass of the tape.

What is claimed is:

1. A system for verifying the accuracy of signal information recorded on a magnetic medium that is transported continuously in one direction relative to a magnetic transducer having a single nonmagnetic gap comprising:
means for reading out the recorded signal information;
means for checking the accuracy of the read out information;
and means for correcting inaccurately recorded signals, said means for reading, said means for checking and said means for correcting all operating during a single pass of the medium past said single nonmagnetic gap of the transducer.

2. A system for verifying the accuracy of signal information recorded on a magnetic medium that is transported continuously in one direction relative to a magnetic transducer having a single nonmagnetic gap comprising:
means for reading out the recorded signal information;
means for checking the accuracy of the read out information;
means for correcting inaccurately recorded signals;
and means for reading out the corrected signal, said means for reading, said means for checking, said means for correcting and said means for reading out the corrected signal all operating during a single pass of the magnetic medium by said single nonmagnetic gap.

3. A system for verifying the accuracy of signal information recorded on a magnetic tape that is transported continuously in one direction relative to a magnetic transducer having a single nonmagnetic gap comprising:
a bridge circuit for sensing the recorded signal information;
a decision circuit for checking the accuracy of the sensed signal;
said decision circuit including means for correcting inaccurately recorded signals;
and means for reading out the corrected signal, said bridge circuit, said decision circuit and said means for reading out all operating during a single pass of the tape past said single nonmagnetic gap.

4. A system for verifying the accuracy of signal information recorded on a magnetic tape that is transported relative to a magnetic transducer assembly having a nonmagnetic gap comprising:
a bride circuit for receiving a playback signal representative of the recorded signal from such transducer assembly during the playback mode;
a feedback loop coupled to the output and input circuits of said bridge circuit comprising means for determining the accuracy of the playback signal;
and means for recording a correction signal when an error is sensed by the determining means, said bridge circuit, said means for determining the accuracy and said means for recording the correction signal all operating during a single pass of the magnetic tape past the magnetic transducer.

5. A system for verifying the accuracy of signal information recorded on a magnetic tape that is transported relative to a magnetic transducer comprising:
a bridge circuit for deriving a playback signal from the recorded tape;
a decision circuit coupled to the bridge circuit for determining the accuracy of such recorded information signal, such decision circuit including means for providing a correction signal in the event that the playback signal is not accurate;
a time delay coupled to the decision circuit for delaying the correction signal that may be generated by such decision circuit for application to the bridge circuit;
and means for applying the delayed correction signal to the bridge circuit for recording the correction signal thereby erasing the erratic signal on the magnetic tape.

6. A system for verifying the accuracy of signal information recorded on a magnetic tape that is transported relative to a single magnetic transducer assembly having a non-magnetic gap comprising:
a bridge circuit for receiving a playback signal representative of the recorded signal from such transducer assembly during the playback mode;
a feedback loop coupled to the output and input circuits of said bridge circuit comprising;
a difference amplifier for comparing the playback signal to a reference signal;
a checking signal source for providing the reference signal to said difference amplifier;
means for applying the playback signal simultaneously and in synchronism with the reference signal;

and means for recording a correction signal when the compared playback signal is in error, said bridge circuit and said feedback loop including said difference amplifier, said checking signal source, said means for applying the playback signal, and said means for recording a correction signal, all operating during a single pass of the magnetic tape past the single magnetic transducer.

7. A system for verifying the accuracy of signal information recorded on successive discrete areas in portions of a magnetic tape that is transported relative to a magnetic transducer having a single nonmagnetic gap comprising:

means for reading out in sequence the signal portions recorded on each discrete area, said readout means including a bridge circuit;

means for checking the accuracy of each signal portion;

means for correcting inaccurately recorded signal portions;

and means for reading out the corrected signal portion, such readout, checking and correcting means operating in sequence during a single pass of the tape relative to the transducer.

8. A system for verifying the accuracy of signal information recorded on a magnetic tape that is transported relative to a transducer assembly having a single nonmagnetic gap comprising:

a bridge circuit for receiving a playback signal from such transducer assembly during the playback mode;

a difference amplifier circuit coupled to the bridge circuit for determining whether the polarity and amplitude of the playback signal is accurate;

a checking input source for providing a reference signal representing the accurate signal coupled to such difference amplifier circuit;

and a time delay coupled between the difference amplifer circuit and the bridge circuit to allow the tape portion carrying the recorded signal information being verified to move from the initial readout zone to the recording zone of the nonmagnetic gap in the transducer assembly.

9. A system for verifying the accuracy of signal information recorded on a magnetic tape that is transported relative to a transducer assembly having a single nonmagnetic gap comprising:

a bridge circuit for receiving a playback signal from such transducer assembly during the playback mode;

a feedback loop coupled to the output and input circuits of said bridge circuit for applying a correction signal to the magnetic tape when the playback signal is not accurate;

such feedback loop comprising a difference amplifier circuit for determining whether the polarity and amplitude of the playback signal is accurate;

a checking input source for providing a reference signal respresenting the accurate signal coupled to such difference amplifier circuit;

a time delay coupled between the difference amplifier circuit and the bridge circuit to allow the tape portion carrying the recorded signal information being verified to move from the initial readout zone to the recording zone of the nonmagnetic gap in the transducer assembly;

and switching means coupled to the input circuit of the difference amplifier for opening the feedback loop upon the occurrence of a correction signal thereby preventing undesirable oscillation.

References Cited by the Examiner

UNITED STATES PATENTS

| | | | |
|---|---|---|---|
| 2,789,026 | 4/1957 | Nordyke | 340—174.1 |
| 2,870,430 | 1/1959 | Hancock | 340—174.1 X |
| 2,871,464 | 1/1959 | Wright et al. | 340—174.1 |
| 3,056,950 | 10/1962 | Birmingham et al. | 340—174.1 |
| 3,096,511 | 7/1963 | Taras | 340—174.1 |

IRVING L. SRAGOW, *Primary Examiner.*

R. M. JENNINGS, A. I. NEUSTADT, *Assistant Examiners.*